(12) United States Patent
Musiał et al.

(10) Patent No.: US 12,573,878 B2
(45) Date of Patent: Mar. 10, 2026

(54) WIRELESS CHARGING APPARATUS

(71) Applicant: Aptiv Technologies AG, Schaffhausen (CH)

(72) Inventors: Michal M. Musiał, Cracow (PL); John Mecca, Oakland Township, MI (US); James R. Cook, Youngstown, OH (US); Evan Wallace, Shelby Township, MI (US)

(73) Assignee: Aptiv Technologies AG, Schaffhausen (CH)

( * ) Notice: Subject to any disclaimer, the term of this patent is extended or adjusted under 35 U.S.C. 154(b) by 734 days.

(21) Appl. No.: 17/873,140

(22) Filed: Jul. 26, 2022

(65) Prior Publication Data

US 2024/0039328 A1    Feb. 1, 2024

(51) Int. Cl.
*H02J 50/00*        (2016.01)
*H02J 50/10*        (2016.01)

(52) U.S. Cl.
CPC ............ *H02J 50/005* (2020.01); *H02J 50/10* (2016.02)

(58) Field of Classification Search
CPC ................................ H02J 50/005; H02J 50/10
USPC ......................................................... 320/108
See application file for complete search history.

(56) References Cited

U.S. PATENT DOCUMENTS 9,667,077 B2    5/2017  Kim et al.
10,245,963 B2   4/2019  Ansari et al.

2014/0062392 A1*  3/2014  Lofy ................... H05K 7/20136
                                                    320/108
2016/0181849 A1*  6/2016  Govindaraj ........... H02J 7/0044
                                                    320/108
2018/0224909 A1   8/2018  Koo et al.
2020/0091755 A1*  3/2020  Larsson ................ H02J 7/0044
2020/0251929 A1   8/2020  Partovi
2021/0050741 A1   2/2021  Pinkos et al.
2021/0218256 A1*  7/2021  Yang ........................ H01F 38/14
2021/0339641 A1* 11/2021  Wechsler ................ B60L 53/30

FOREIGN PATENT DOCUMENTS

CN      206099415 U     4/2017
CN      107947304 A     4/2018
CN      208401601 U     1/2019
CN      209658961 U     11/2019
CN      211556913 U     9/2020
KR      102097026 B1    4/2020

* cited by examiner

*Primary Examiner* — Suchin Parihar
(74) *Attorney, Agent, or Firm* — Billion & Armitage

(57)            ABSTRACT

A wireless charging device includes a main housing having a first end and a second end and a channel extending between the first end and the second end, a wireless charging coil located within the main housing separately from the channel, and a top housing located adjacent to the main housing and having a top surface and a bottom surface. The top surface is configured to receive a device to be charged, and the bottom surface is directly exposed to the channel, wherein the top housing is comprised of a thermally conductive and electrically insulative material, and wherein the channel is configured to guide airflow along the bottom surface of the top housing to dissipate heat within the wireless charging device.

20 Claims, 3 Drawing Sheets

WIRELESS CHARGING APPARATUS

TECHNICAL FIELD

The present disclosure is directed generally to wireless chargers and in particular to wireless chargers configured to reduce thermal energy in the wireless charger and charging device.

BACKGROUND

Wireless charging devices utilize magnetic coupling or inductive coupling to transfer power between the wireless charger and the device to be charged (e.g., smartphone, tablet, etc.). The wireless charging device includes a surface that is located adjacent to the device to be charged. The transmission of power between the wireless charger and the device to be charged results in thermal energy that needs to be dissipated. Various methods of reducing/mitigating thermal energy have been proposed, but with varying levels of success. It would therefore be beneficial to develop a wireless charging device that provides improved thermal performance.

SUMMARY

According to one aspect, a wireless charging device includes a main housing having a first end and a second end and a channel extending between the first end and the second end, a wireless charging coil located within the main housing separately from the channel, and a top housing located adjacent to the main housing and having a top surface and a bottom surface. The top surface is configured to receive a device to be charged, and the bottom surface is directly exposed to the channel, wherein the top housing is comprised of a thermally conductive and electrically insulative material, and wherein the channel is configured to guide airflow along the bottom surface of the top housing to dissipate heat within the wireless charging device.

According to another aspect, a wireless charging device includes a main housing having a first end and a second end and a channel extending between the first end and the second end, a wireless charging coil located within the main housing, and a top housing located adjacent to the main housing and having a top surface configured to receive a device to be charged. In addition, the wireless charging device includes an electrically insulative, thermally conductive insert configured to fit within the channel, wherein the insert includes a first plurality of protrusions that extend at least partially into the channel and a second plurality of protrusions that extend at least partially into the top housing.

According to another aspect, a wireless charging device includes a main housing having a first end and a second end and a channel extending between the first end and the second end, a wireless charging coil located within the main housing, and a top housing located adjacent to the main housing and having a top surface configured to receive a device to be charged, wherein the top housing is comprised of a thermally conductive and electrically insulative material. In addition, the wireless charging device also includes an electrically insulative, thermally conductive insert configured to fit within the channel, wherein the insert includes a first plurality of protrusions that extend at least partially into the channel.

DETAILED DESCRIPTION

According to some aspects, the disclosure provides a wireless charging device that provides efficient mitigation of thermal energy within the wireless charging device and the device to be charged.

Figure 1:
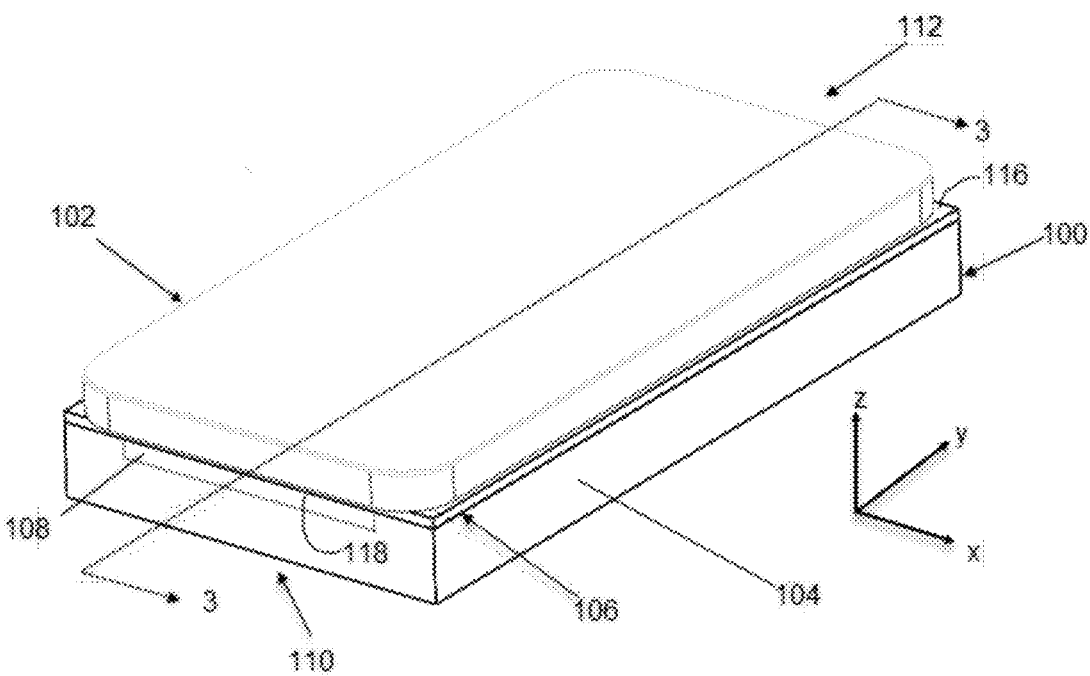
FIG. 1 is an isometric view of a charging system that includes a wireless charging device and a device to be charged according to some embodiments.

FIG. 1 is an isometric view of a charging system that includes a wireless charging device 100 and a device to be charged 102 according to some embodiments. The wireless charging device 100 includes a main housing 104 and a top housing 106. The main housing 104 includes a first end 110 and a second end 112 and a channel 108 extending longitudinally (i.e., along the y-axis) between the first end 110 and the second end 112. The top housing 106 is located adjacent to the main housing 104 and includes a top surface 116 that is configured to receive the device to be charged 102 and a bottom surface 118 that is directly exposed to the channel 108. In some embodiments, a fan (shown in FIG. 3) is positioned at either the first end 110 or the second end 112 to provide cooling airflow to the channel 108.

In some embodiments, the channel 108 extends longitudinally (i.e., along the y-axis) along a length of the main housing 104 from the first end 110 to the second end 112. The channel is located adjacent to the bottom surface 118 of the top housing 106 and acts to transfer heat from the top housing 106. The channel 108 is further defined by a height (in the Z-axis) and width (in the x-axis). In some embodiments, the height is selected to provide sufficient volume of airflow to dissipate heat while minimizing the distance between the respective magnetic charging coils located in the main housing 104 and the device to be charged 102. Likewise, the width is selected to maximize the surface area of the top housing 106—specifically the bottom surface 118—exposed to the channel 108. In some embodiments, the top surface 116 of the top housing 106 is planar and sealed and configured to receive the device to be charged 102, which is placed adjacent to the top surface 116 as shown in FIG. 1.

In some embodiments, the top housing 106 is comprised of a material that is electrically insulative and thermally conductive. An electrically insulative material is required to prevent interference/blocking of the wireless charging power delivered from the wireless charging device 100 to the device to be charged 102. A thermally conductive material allows for heat generated by the device to be charged 102 to be distributed more evenly along the surface area/volume of the top housing 106. This prevents select portions of the device to be charged 102 from overheating and improves the heat dissipation provided by air flowing through the channel 108. In some embodiments, the top housing 106 is comprised of a Boron-Nitride (BN) doped polymer that provides the desired characteristics of electrically insulative and thermally conductive.

In some embodiments, the main housing 104 is comprised of a material that is also electrically insulative and thermally conductive. For example, the main housing 104 may be comprised of the same material as the top housing 106 (e.g., BN-doped polymer). However, in other embodiments it may be advantageous if the main housing 104 is not comprised of a material that is thermally conductive (i.e., comprised of a thermally insulative material). In this way, thermal energy transferred to the top housing 106 is not communicated or transferred to the main housing 104 but is instead dissipated by the airflow through the channel 108. In still other embodiments, it may be beneficial for the portions of the top housing 106 and main housing 104 surrounding the channel 108 to be thermally conductive (as well as electrically insulative). In this way, heat may be transferred or communicated to those portions of the housing (main housing 104/top housing 106) adjacent to the channel 108 to transfer the heat away from the wireless charging device 100.

Figure 2:
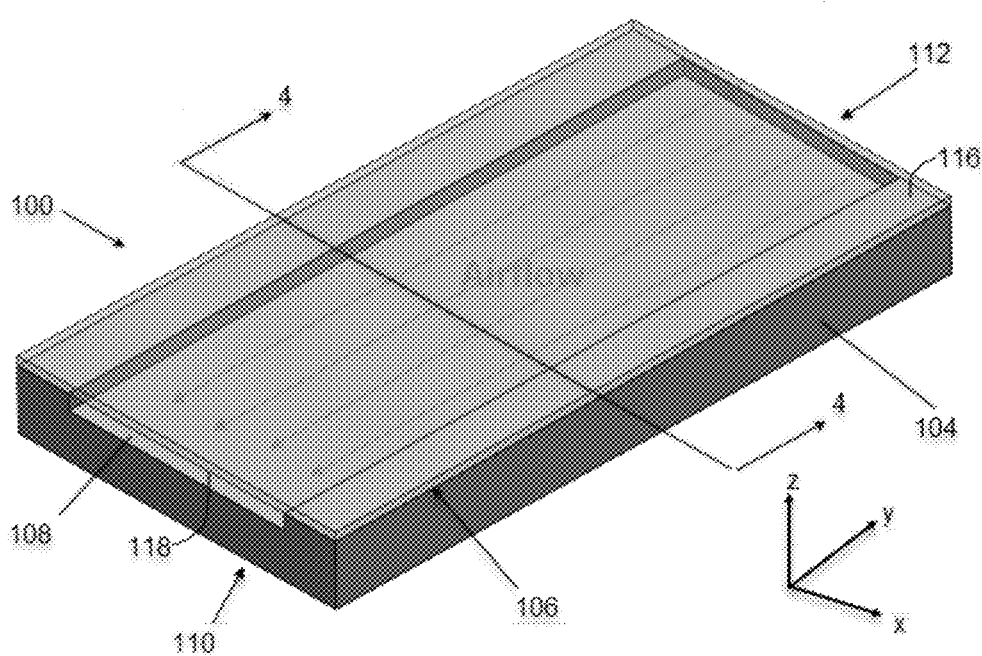
FIG. 2 is an isometric view of the wireless charging device according to some embodiments.

FIG. 2 is an isometric view of the wireless charging device 100 according to some embodiments. The embodiment shown in FIG. 2 removes the device to be charged 102 from the view and illustrates the top housing 106 as at least partially transparent to better illustrated the geometry of the channel 108 and the airflow therethrough. In the embodiment shown in FIG. 2, a fan (not shown) or associated ducting provides airflow longitudinally along the y-axis from the second end 112 to the first end 110 of the main housing 104. The top housing 106—being thermally conductive—allows heat to be evenly (or approximately evenly) distributed along the surface area of the top housing 106. The airflow through the channel 108 transfers heat away from the wireless charging device 100 and device to be charged 102. In the examples shown in FIGS. 1-4, the channel 108 is open and cooling is provided via the flow of air through the channel 108.

Figure 3:
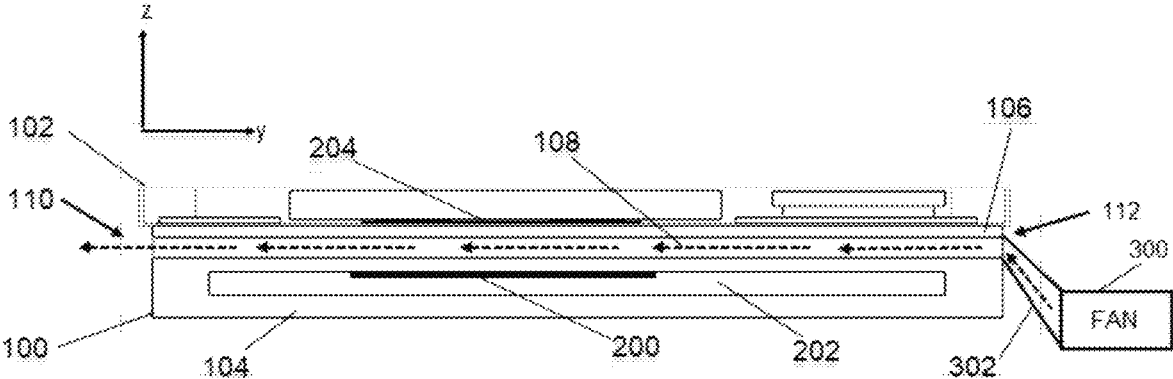
FIG. 3 is a cross-sectional view of the charging system taken at line 3-3 in FIG. 1 according to some embodiments.

FIG. 3 is a cross-sectional view of the charging system taken at line 3-3 in FIG. 1 according to some embodiments. In particular, the cross-sectional view shown in FIG. 3 illustrates the location of charging coil 200 and circuit board 202 housed within the main housing 104 and receiving coil 204 housed within the device to be charged 102 in some embodiments, charging coil 200 and circuit board 202 are housed within the main housing 104 separately from the channel 108. In some embodiments, the portion of the main housing 104 located between the charging coil 200/circuit board 202 and the channel 108 comprises electrically insulating, thermally conductive material to allow heat generated by the charging coil 200 to be transferred to the area located adjacent to the channel 108. In other embodiments, the portion of the main housing 104 located between the charging coil 200 and the channel 108 is both electrically and thermally insulating. In still other embodiments, it may be beneficial to locate the charging coil 200 adjacent to the channel 108 to dissipate heat generated by the charging coil 200.

Thermal energy generated by the receiving coil 204 is transferred via conduction to the top housing 106 located adjacent to the device to be charged 102. Heat is transferred from the top housing 106 via convection as a result of airflow provided through the channel 108. In the embodiment shown in FIG. 3, a fan 300 is located at the second end 112 of the main housing 104. The fan 300 provides airflow through the channel 108 from the second end 112 towards the first end 110. In some embodiments, a duct 302 may be positioned to direct airflow from the fan 300 to the channel 108. As a result, the fan 300 may not be required to be located adjacent to the wireless charging device 100, so long as the duct 302 is able to direct airflow into the channel 108.

Figure 4:
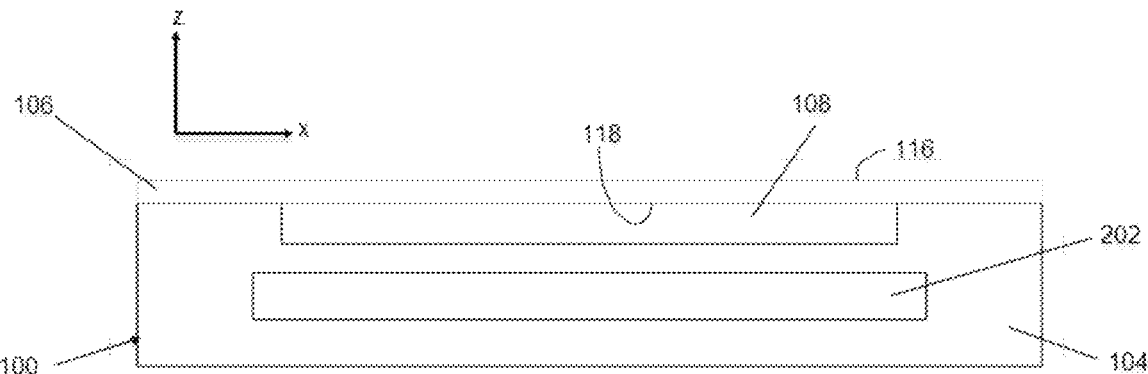
FIG. 4 is a cross-sectional view of the wireless charging device taken at line 4-4 in FIG. 2 according to some embodiments.

Likewise, FIG. 4 is a cross-sectional view of the wireless charging device 100 taken at line 4-4 in FIG. 2 according to some embodiments. The device to be charged 102 is not shown in this view. The position of the top housing 106 adjacent to the channel 108 is illustrated, with the bottom surface 118 of the top housing 106 being directly exposed to the channel 108. In this way, airflow through the channel 108 conducts or transfers heat away from the top housing 106. As described above, the main housing 104 may be either thermally conductive or thermally insulative depending on the desired heat flow characteristics. In some embodiments, it is beneficial for the main housing 104 to be thermally insulative to prevent heat from being transferred to the main housing 104.

The embodiments shown in FIGS. 1-4 utilize a top housing comprised of an electrically insulative, thermally conductive material and airflow through an adjacent channel to dissipate heat. In the embodiments shown in FIGS. 5-7, either alone or in conjunction with the top housing made of thermally conductive material, an insert is provided within the channel to further aid in dissipating heat.

Figure 5:
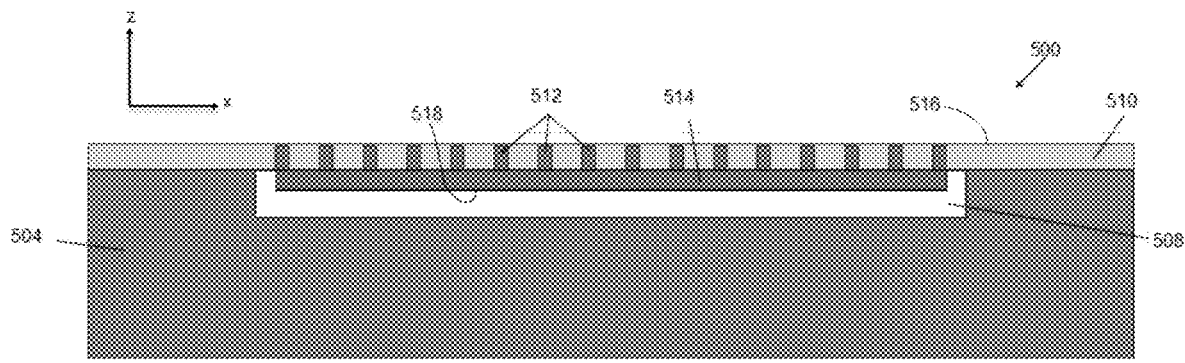
FIG. 5 is a cross-sectional view of the wireless charging device according to another embodiments.

FIG. 5 is a cross-sectional view of the wireless charging device 500 according to another embodiment. In this embodiment, the wireless charging device 500 once again includes a main housing 504 having a channel 508 extending between a first end and second end of the main housing 504, and a top housing 510 located adjacent to the main housing 504 and having a top surface 516 that is configured to receive the device to be charged. In some embodiments, the top surface 516 is sealed or solid (i.e., no holes or other apertures). In addition, in the embodiment shown in FIG. 5, an insert 514 is positioned within at least a portion of the channel 508. In some embodiments, the insert 514 is electrically insulative and thermally conductive. In the embodiment shown in FIG. 5, the insert 514 includes a first plurality of protrusions 512 that extend into the top housing 510 or are included as part of the top housing 510 and a bottom surface 518 that is directly exposed to the channel 508. In some embodiments, at least a portion of the insert 514 is located within the channel 508. In other embodiments, only the bottom surface 518 may be directly exposed to the channel 508. In some embodiments, the first plurality of protrusions 512 are also electrically insulative and thermally conductive and are configured to aid in the transfer of heat away from the top surface 516 while not interfering with the wireless transfer of power. For example, in some embodiments the first plurality of protrusions 512 are comprised of a thermally conductive plastic (e.g., BN-doped polymer). Heat is transferred from the first plurality of protrusions 512 to the portion of the insert 514 located within the channel 508, wherein airflow through the channel 508 aids in dissipating heat.

In some embodiments, the top housing 510 is comprised of electrically insulative and thermally conductive material (as described in FIGS. 1-4 above). In this embodiment, the plurality of protrusions 512 may not be required as all of the material included in the top housing 510 and the insert 514 is comprised of electrically insulative and thermally conductive material. In other embodiments, the top housing 510 is comprised of an electrically insulating material that is not thermally conductive. In this embodiment, the first plurality of protrusions 512 extend at least partially into the top housing 510 and act to transfer heat away from the top surface 516 and toward the channel 508. In some embodiments, the first plurality of protrusions 512 extend through the top housing 510 to the top surface 516, such that the plurality of protrusions 512 are brought into contact with the wireless device to be charged (not shown in this view).

The geometry of the first plurality of protrusions 512 may vary from application to application. In some embodiments, each of the first plurality of protrusions 512 are fins optimized for heat transfer. In other embodiments, each of the first plurality of protrusions 512 are pins (e.g., cylinder-shaped, cubicle-shaped, etc.). In the embodiment shown in FIG. 5, the first plurality of protrusions 512 are spaced out along the width of the channel 508 (in the x-direction), and each of the plurality of protrusions 512 extends in the longitudinal direction (i.e., along they-axis, into the page) along a length of the channel 508. In some embodiments the first plurality of protrusions 512 extend along the entire length of the channel 508, while in other embodiments the first plurality of protrusions 512 extend along only a portion of the length of the channel 508. Likewise, the spacing between adjacent protrusions may be selected to provide the desired heat dissipation response. In some embodiments there may be multiple separate inserts 514 that are spaced apart along the width of the channel 508 (in the x-direction) or in the longitudinal direction of the channel 508 (i.e., along they-axis).

In some embodiments, the main housing 504 is not thermally conductive and therefore prevents or resists the transfer of heat to the main housing 504 of the wireless charging device 500. In this way, heat is transferred most efficiently to the area adjacent to the channel 508, wherein the airflow through the channel 508 aids in the removal of heat from the wireless charging device 500.

Figure 6:
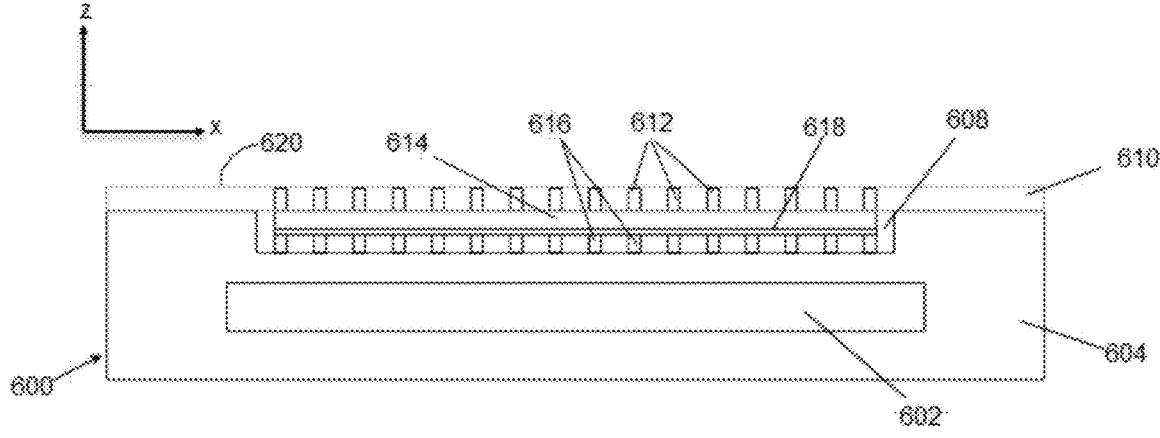
FIG. 6 is a cross-sectional view of the wireless charging device according to another embodiment.

FIG. 6 is a cross-sectional view of the wireless charging device 600 according to another embodiment. In this embodiment, the wireless charging device 600 once again includes a main housing 604 having a channel 608 extending between a first end and second end of the main housing 604, and a top housing 610 located adjacent to the main housing 604 and having a top surface 620 that is configured to receive the device to be charged. A circuit board 602 is housed within the main housing 604. In contrast with the embodiment shown in FIG. 5, the embodiment shown in FIG. 6 includes an insert 614 that includes both a first plurality of protrusions 612 extending into at least a portion of the top housing 610 and a second plurality of protrusions 616 extending into at least a portion of the channel 608. The insert 614 is once again electrically insulative and thermally conductive and may include an insert body 618 from which the first plurality of protrusions 612 and/or the second plurality of protrusions 616 extend. For example, the insert 614 may be comprised of a thermally conductive plastic such as a BN-doped polymer. In the embodiment shown in FIG. 6, the insert 614 includes a first plurality of protrusions 612 that extend into the top housing 610 or are included as part of the top housing 610 and a second plurality of protrusions 616 that extend into the channel 608. In some embodiments, the first plurality of protrusions 612 and the second plurality of protrusions 616 are also electrically insulative and thermally conductive and are configured to aid in the transfer of heat away from the top surface 620 while not interfering with the wireless transfer of power. For example, in some embodiments the first plurality of protrusions 612 and the second plurality of protrusions 616 are comprised of a thermally conductive plastic (e.g., BN-doped polymer) Heat is transferred from the first plurality of protrusions 612 to the portion of the insert 614 located within the channel 608, including the second pair of protrusions 616. In some embodiments, the additional surface area provided by the second pair of protrusions 616 (as compared with the embodiment shown in FIG. 5) further aids in transferring heat from the wireless charging device 600.

In some embodiments, the top housing 610 is comprised of an electrically insulating material that is not thermally conductive. That is, only the first plurality of protrusions 612 located within the top housing 610 are thermally conductive. In this embodiment, the first plurality of protrusions 612 extend at least partially into the top housing 610 and act to transfer heat away from the top surface 620 and toward the channel 608. In some embodiments, the first plurality of protrusions 612 extend through the top housing 610 to the top surface 620, such that the first plurality of protrusions 612 are brought into contact with the wireless device to be charged (not shown in this view) and act to transfer heat away from the top surface 620 toward the channel 608. However, in some embodiments, the top housing 610 is also comprised of electrically insulative and thermally conductive material (as described in FIGS. 1-4 above), such as a thermally conductive plastic (e.g., BN-doped polymer) that works in conjunction with the insert 614. In this embodiment, the first plurality of protrusions 612 may not be required, and the insert 614 may be comprised only of the second plurality of protrusions 616 extending into the channel 608.

Likewise, in some embodiments the second plurality of protrusions 616 extend at least partially into the channel 608 toward the main housing 604. In some embodiments, the second plurality of protrusions 616 extend across the entire height (i.e., in the z-direction) of the channel 608 and are located in contact with or very nearly in contact with the main housing 604.

The geometry of the second plurality of protrusions 616 (and the first plurality of protrusions 612) may vary from application to application. As described above, in some embodiments the geometry of the first plurality of protrusions 612 and the second plurality of protrusions 616 are selected to provide the desired heat transfer characteristics. In some embodiments, one or both of the first plurality of protrusions 612 and the second plurality of protrusions 616 are fins optimized for heat transfer. In other embodiments, one or both of the first plurality of protrusions 612 and the second plurality of protrusions 616 are pins (e.g., cylinder-shaped, cubicle-shaped, etc.). In the embodiment shown in FIG. 6, the second plurality of protrusions 616 are spaced out along the width of the channel 608 (in the x-direction), and each of the plurality of protrusions 616 extends in the longitudinal direction (i.e., along the y-axis, into the page) along a length of the channel 608. In some embodiments the second plurality of protrusions 616 extend along the entire length of the channel 608, while in other embodiments the second plurality of protrusions 616 extend along only a portion of the length of the channel 608. Likewise, the spacing between adjacent protrusions may be selected to provide the desired heat dissipation response. Cooling airflow is provided in the space between the second plurality of protrusions 616.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A wireless charging device comprising:
a main housing having a first end and a second end and a channel extending between the first end and the second end;
a wireless charging coil located within the main housing separately from the channel;
an electrically insulative, thermally conductive insert configured to be at least partially received within the channel; and
a top housing located adjacent to the main housing and having a top surface and a bottom surface, the top surface is configured to receive a device to be charged, and the bottom surface is directly exposed to the channel, wherein the top housing is comprised of a thermally conductive and electrically insulative material, and wherein the channel is configured to guide airflow along the bottom surface of the top housing to dissipate heat within the wireless charging device.

2. The wireless charging device of claim 1, further including a fan configured to provide airflow to the channel via the first end of the main housing to dissipate heat within the wireless charging device.

3. The wireless charging device of claim 1, wherein the top housing is comprised of a Boron-Nitride (BN) doped polymer, and wherein the main housing is comprised of an electrically insulative and thermally insulative material.

4. The wireless charging device of claim 1,
wherein the insert includes a first surface located adjacent to the top housing and a plurality of protrusions extending away from the first surface into the channel.

5. The wireless charging device of claim 1, wherein the electrically insulative, thermally conductive insert is positioned between the top surface of the top housing and a bottom surface of the channel.

6. The wireless charging device of claim 4, wherein the plurality of protrusions include a plurality of fins.

7. The wireless charging device of claim 4, wherein the plurality of protrusions include a plurality of pins.

8. A wireless charging device comprising:
a main housing having a first end and a second end and a channel extending between the first end and the second end;
a wireless charging coil located within the main housing;
a top housing located adjacent to the main housing and having a top surface configured to receive a device to be charged; and
an electrically insulative, thermally conductive insert configured to fit within the channel, wherein the insert includes a first plurality of protrusions that extend at least partially into the channel and a second plurality of protrusions that extend at least partially into the top housing.

9. The wireless charging device of claim 8, wherein the top housing is comprised of an electrically and thermally insulative material.

10. The wireless charging device of claim 8, wherein the first plurality of protrusions extend to a bottom surface of the channel.

11. The wireless charging device of claim 8, further including a fan for directing airflow through the channel.

12. The wireless charging device of claim 8, wherein the first plurality of protrusions extend along a longitudinal length of the channel, and wherein airflow is directed between the first plurality of protrusions along the longitudinal length of the channel.

13. The wireless charging device of claim 8, wherein the first plurality of protrusions are comprised of a Boron-Nitride (BN) doped polymer.

14. The wireless charging device of claim 8, wherein the top surface is sealed and planar.

15. The wireless charging device of claim 8, wherein at least one of the first plurality of protrusions and the second plurality of protrusions includes a plurality of fins.

16. A wireless charging device comprising:
a main housing having a first end and a second end and a channel extending between the first end and the second end;
a wireless charging coil located within the main housing;
a top housing located adjacent to the main housing and having a top surface configured to receive a device to be charged, wherein the top housing is comprised of a thermally conductive and electrically insulative material;; and
an electrically insulative, thermally conductive insert configured to fit within the channel, wherein the insert includes a first plurality of protrusions that extend at least partially into the channel.

17. The wireless charging device of claim 16, wherein the insert includes a top surface that is located adjacent to a bottom surface of the top housing.

18. The wireless charging device of claim 16, wherein the top housing is configured to receive a device to be charged, wherein the top housing is comprised of a Boron-Nitride (BN) doped polymer.

19. The wireless charging device of claim 16, wherein the insert includes a second plurality of protrusions that extent at least partially into the top housing.

20. The wireless charging device of claim 19, wherein at least one of the first plurality of protrusions and the second plurality of protrusions includes a plurality of fins.

* * * * *